(12) United States Patent
Hitomi (10) Patent No.: US 6,730,427 B2
(45) Date of Patent: *May 4, 2004

(54) ELECTRODE FOR FUEL CELL AND METHOD OF MANUFACTURING THE SAME

(75) Inventor: Shuji Hitomi, Kyoto (JP)

(73) Assignee: Japan Storage Battery Co., Ltd., Kyoto (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/455,938

(22) Filed: Dec. 7, 1999

(65) Prior Publication Data

US 2003/0129477 A1 Jul. 10, 2003

(30) Foreign Application Priority Data

Dec. 7, 1998 (JP) .......................... P. 10-347264

(51) Int. Cl.$^7$ .............................. H01M 4/90; H01M 4/96
(52) U.S. Cl. ...................... 429/40; 429/44; 502/101
(58) Field of Search ..................... 429/40, 41, 42; 502/101

(56) References Cited

U.S. PATENT DOCUMENTS

| | | | | |
|---|---|---|---|---|
| 5,294,232 A | * | 3/1994 | Sakairi et al. | 29/623.5 |
| 5,728,485 A | * | 3/1998 | Watanabe et al. | 429/41 |
| 6,156,449 A | * | 12/2000 | Zuber et al. | 429/42 |
| 6,165,636 A | * | 12/2000 | Giallombardo et al. | 429/44 |
| 6,344,291 B1 | * | 2/2002 | Hitomi | 429/42 |
| 6,528,201 B1 | * | 3/2003 | Hitomi | 429/42 |

FOREIGN PATENT DOCUMENTS

| EP | 0920065 A1 | 6/1999 |
|---|---|---|
| EP | 0920065 | * 6/1999 |

OTHER PUBLICATIONS

H.–F. Oetjen, et al. "Performance Data of a Proton Exchange Membrane Fuel Cell Using $H_2$/CO as Fuel Gass" J. Electrochem. Soc. vol. 143, No. 12, Dec. 1996 pp. 38383842.

S. Hitomi et al., "New Conceptual Ultra Low Platinum Loading Gas Diffusion Electrode", Corporate R&D Center, Japan Storage Battery Co., Ltd. Nov. 14, 1999.

S. Hitomi, et al, "New Conceptual Ultra Low Platinum Loading Gas Diffusion Electrode", The 3$^{rd}$ International Fuel Cell Conference, Corporate R&D Center, Japan Storage Battery Co., Ltd., 111, Nov. 30, 1999.

* cited by examiner

Primary Examiner—Patrick Ryan
Assistant Examiner—Tracy Dove
(74) Attorney, Agent, or Firm—Sughrue Mion, PLLC (57) ABSTRACT

Catalyst material containing two or more kinds of metal elements or/and silicon are mainly carried in proton conductive passages of a solid polymer electrolyte and the surface of each of carbon particles which abut on each the proton conductive passages.

5 Claims, 5 Drawing Sheets

ELECTRODE FOR FUEL CELL AND METHOD OF MANUFACTURING THE SAME

BACKGROUND OF THE INVENTION

1. Field of the Invention

The present invention relates to an electrode for a fuel cell and a method for manufacturing the same.

2. Description of the Related Art

A solid polymer electrolyte fuel cell is composed of an electrolyte of an ion exchange membrane such as a perfluorosulfonic acid membrane and electrodes of an anode and a cathode bonded to both surfaces thereof. The electrolyte fuel cell generates a power under an electrochemical reaction by supplying a reducing agent (e.g. hydrogen, methanol, hydrazine, etc.) to the anode and an oxidizing agent (e.g. air, oxygen, etc.) to the cathode. The electrochemical reaction occurring in each electrode using oxygen as the oxidizing agent and hydrogen as the reducing agent is as follows.

Anode: $H_2 \rightarrow 2H^+ + 2e^-$
Cathode: $1/2O_2 + 2H^+ + 2e^- \rightarrow H_2O$
Entire reaction: $H_2 + 1/2O_2 \rightarrow H_2O$ As understood from this reaction, the reaction in each electrode proceeds only in a three-phase boundary where a gas (hydrogen or oxygen) that is an active material, a proton ($H^+$) and an electron ($e^-$) are simultaneously transferred.

Figure 2:
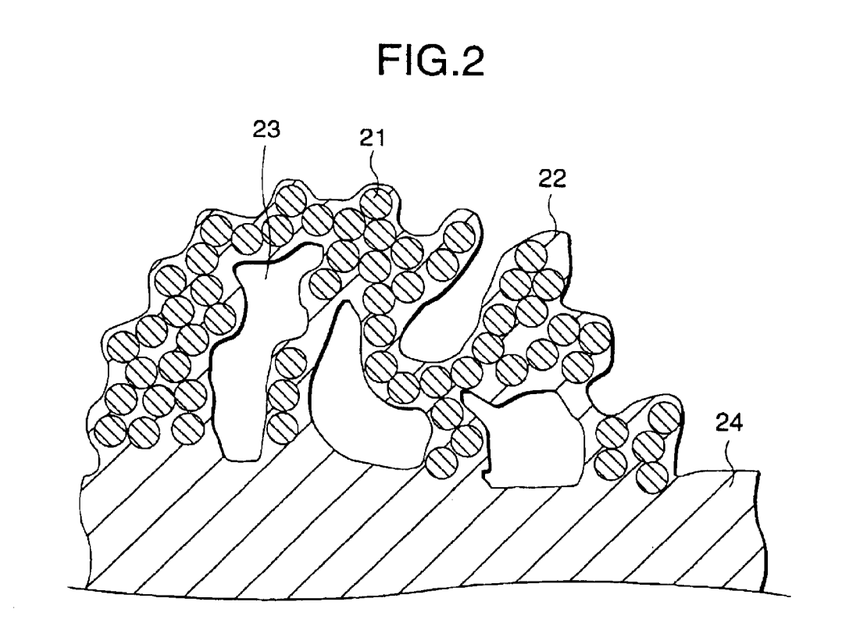
FIG. 2 is a conceptual view showing the state of surfaces of carbon particles in a general composite electrode of a solid polymer electrolyte and a catalyst.

An example of the electrode having such a function is a composite electrode of a solid polymer electrolyte-catalyst containing carbon particles and catalyst material as well as a solid polymer electrolyte. The macroscopic state of this electrode is shown conceptually in FIG. 2. In FIG. 2, reference numeral 21 denotes carbon particle, 22 a solid polymer electrolyte, 23 one of pores, and 24 an ion exchange membrane. As seen from FIG. 2, the composite electrode is a porous electrode in which carbon particles 21 supporting the catalyst material and solid polymer electrolyte 22 are mixed with each other so that they are distributed three-dimensionally, and plural pores are formed. In this composite electrode, the carbon supporting the catalyst constitutes an electron conductive channel, the solid polymer electrolyte constitutes a proton conductive passage and the pore constitutes a channel of supplying/discharging oxygen or hydrogen and water which is a product. Within the electrode, these three channels are distributed three-dimensionally so that an infinite number of three-phase boundaries capable of transferring gas, protons ($H^+$) and electrons ($e^-$) simultaneously are formed to provide a field of the electrode reaction.

Conventionally, the electrode having such a structure has been manufactured by a method comprising the steps of preparing a paste composed of a catalyst supported on carbon particles (in which platinum group metal particles such as platinum particles are supported on carbon particle with highly dispersion) and a PTFE (polytetrafluoroetylene) particle dispersed solution, dispersing the paste on the polymer film or a carbon electrode substrate of an electroconductive porous material to make a film (generally having a thickness of 3–30 μm), heating/drying the film, and applying a solid polymer electrolyte solution onto the film so that the film is impregnated with the solution. The electrode has been also manufactured by the method comprising a steps of preparing a paste composed of the above catalyst supported on carbon particles, PTFE particles and a solid polymer electrolyte solution, dispersing the paste on the polymer film or the carbon electrode substrate of electroconductive porous material to make a film (generally having a thickness of 3–30 μm), and thereafter heating/drying the film. Incidentally, the solid polymer electrolyte solution was prepared by dissolving the material having the same composition as the ion exchange membrane described above in alcohol to provide a solution. The PTFE particles dispersed solution was prepared as a solution dispersed with PTFE particles having a particle diameter of about 0.23 μm.

The solid polymer electrolyte fuel cell, which has advantages of capable of being actuated at room temperature and being compact and light as well as having a high power, has been developed for use in an application of an electric vehicle. Such a type fuel cell generally uses a gaseous fuel such as hydrogen as a reducing agent, or otherwise a liquid fuel such as methanol, hydrazine, etc.

The case of using hydrogen as the reducing agent includes systems of storing hydrogen in a highly compressed bomb, and storing hydrocarbon fuel such as methanol or natural gas as a raw material and reforming it into hydrogen for use by a reforming device. The latter system is predominant in view of the total cost and official infrastructure for circulation. The reforming reaction using methanol is as follows.

$$CH_3OH + H_2O \rightarrow 3H_2 + CO_2 + (CO)$$

The system using this reaction has a disadvantage that a very small quantity of CO created as well as $CO_2$ poisons the catalyst material such as platinum for the anode of the fuel cell and hence reduces the power.

The fuel cell which directly uses methanol of the liquid fuel as the reducing agent is called a direct methanol fuel cell. This fuel cell has advantages that it is easy to deal with since the liquid fuel is used in the low temperature directly without using the reforming device, and it makes the entire system simple and compact because of unnecessity of the reforming device. However, this fuel cell has a disadvantage that it provides a higher overvoltage due to oxidation of the fuel than the fuel using the gaseous fuel since methanol is oxidized at a low speed, and a large amount of noble metallic catalyst is required in the anode, thus increasing the production cost of the fuel cell.

Nowadays, these problems have been improved greatly by compositely using plural metals as the catalyst.

For example, as a catalyst having a CO tolerance characteristic, an alloy catalyst of Pt—Ru, Pt—Sn, Pt—Pd, Pt—Mn or Pt—Co has been proposed. As a catalyst which is active for the electrochemical oxidation reaction of the liquid fuel such as methanol, an alloy catalyst of Pt—Ru, Sn—Ir, Ru—Ir, Pt—Au or Pd—Ag has been proposed. The reason why activity of the catalyst in the form of an alloy is improved can be understood by some explanations, for example, alloying of platinum shortens the distance among platinum atoms, and the catalyst which is greatly meshed to have a highly active surface is solved away from the secondary metal (e.g. Ru, Sn, Pb, Rh).

The technique of alloying the catalyst has been also applied to the cathode catalyst. For example, it has been reported that the catalyst of Pt—Fe or Pt—Ni exhibits a higher activity for the reduction of oxygen than the catalyst of only platinum (see Masahiro Watanabe, the 38-th Battery Symposium in Japan NO.1I13, P29 (1997)).

A carbon supporting such an alloy catalyst can be acquired by impregnating carbon particles with two or more kinds of metal elements and reducing them. For example, a Ru—Ir alloy supported on carbon can be prepared by impregnating the carbon particles with a mixed water or alcohol solution of mixture of Ru and Ir compounds, drying them and thereafter reducing them by a hydrogen gas. In this case, the carbon particles are directly given the catalyst of mixed Ru and Ir in an atom level.

A Pt—Ru alloy supported on carbon can be prepared by impregnating the carbon particles with a water or alcohol solution of a platinum compound, drying them and thereafter reducing them by a hydrogen gas to provide a platinum supported on carbon, and further impregnating the carbon particles with a water or alcohol solution of a Ru compound, drying them and thereafter reducing them by the hydrogen gas. In this case, the carbon particle supports platinum fine particle covered with the layer of Ru. When the carbon particles are treated by hydrogen at a high temperature (500° C.), the surface is deformed from the Ru layer into the Pt layer.

As described above, attempts of giving the activity which cannot be acquired using the catalyst consisting of a sole metal, by alloying two or kinds of metals have attained a preferable result when the carbon particles support a large amount of catalyst. However, when the amount of catalyst supported on carbon is lowered, the effect of alloying is not remarkable.

The reason therefor is as follows. When it is intended that the carbon particles having a very large surface area per unit weight are simultaneously impregnated into solution of starting catalyst material compounds consisting of two or more kinds of metals compounds and deposited, particles of these metal will be separated so that they will be dispersed solely with high dispersion, respectively, and hence not coagulated sufficiently. Thus, the degree of alloying will be lowered greatly. This will attenuate the CO tolerance characteristic and the activity in the electrochemical reaction of methanol.

From the aspect that the carbon which is a support of the catalyst makes an electron conductive channel, the solid catalyst makes a proton conductive passage and the pore makes a supply/discharge channel of oxygen or hydrogen and water which is a product, a conventional electrode for a fuel cell has been manufactured in the hope of that the catalyst material supported on the carbon particle happened to be located at the three-phase boundary formed in each channel. Such a manufacturing method required a large amount of catalyst. As regards the electrode manufactured by the method described above, it was reported that the utilization of catalyst supported on the carbon was as low as 10% (see Edson A. Ticianelli J. Electroanal. Chem., 251, 275 (1998)).

Namely, taking into consideration that the catalyst is uniformly dispersed at on the surface of the carbon particle, the catalyst at a low rate of 10% contributes to reaction on the surface of the carbon particle having an excessively large surface area. Nevertheless, conventionally, the catalyst was used in such a manner that it is supported on the entire surface of the carbon particle.

The inventors of this invention conceived that if two or more kinds of metals is mainly carried on the three-phase boundary sites relating to the reaction, even with a small amount of catalyst, the metal are not dispersed and hence alloying rate is not also lowered. Therefore, the inventors first investigated the electrode reaction microscopically in order to find the area where the catalyst acts effectively.

As understood from the reports by H. L. Yeager et al (J. Electrochem. Soc., 128, 1880 (1981)) and Ogumi et al (J. Electrochem. Soc., 132, 2601 (1985)), polymer electrolyte consists of proton conductive passage called cluster and hydrophobic backbone. The gas (hydrogen or oxygen) that is needed for electrochemical reaction and water that is a product for the cathode as well as protons translate through a proton conductive passage called a cluster that incorporate the hydrophilic ion-exchange functional group and its counter ion with water, and the hydrophobic backbone does not constitute a moving passage of gas, water and proton.

Therefore, the inventors conceived that the three-phase boundary where the reaction of a fuel cell electrode proceeds is present only on the surface of the carbon particle, constituting the electron conductive channel, in contact with the proton conductive passage called a cluster of the solid polymer electrolyte. Thus, the inventors found that it is necessary to examine the position and distribution of the catalyst material for the proton conductive passage in such a solid polymer electrolyte.

Figure 3:
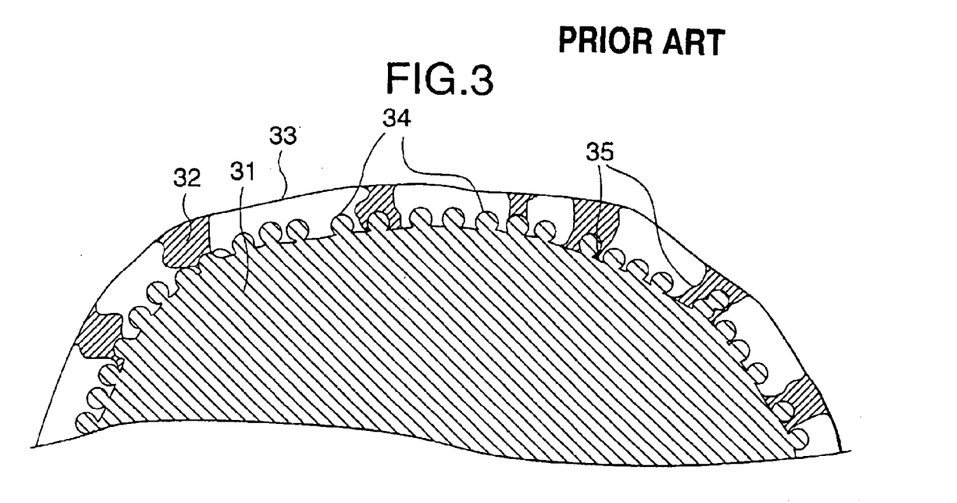
FIG. 3 is a conceptual view showing the state of the surface layer of a carbon particle in contact with a solid polymer electrolyte in a conventional electrode.

FIG. 3 is a conceptual view of the state of the surface of the carbon particle in contact with a solid polymer electrolyte in a conventional electrode. In FIG. 3, reference numeral 31 denotes a carbon particle, 32 a proton conductive passage, 33 a hydrophobic backbone, and 34, 35 catalyst material. In the conventional electrode, the surface of the carbon particle 31 is covered with the solid polymer electrolyte consisting of the proton conductive passage 32 and hydrophobic backbone 33 and supports the catalyst material 34, 35. However, the catalyst material 35 acts effectively since it is located on the carbon surface in contact with the proton conductive passage whereas the catalyst material 34 does not act since it is located on carbon surface in contact with the hydrophobic backbone 33.

SUMMARY OF THE INVENTION

It is an object of the present invention to improve the structure of a microscopic three-phase boundary of an electrode to enhance the catalyst utilization, thereby facilitating alloying of the catalyst.

The present invention has been accomplished on the basis of new findings that a three-phase boundary is located on the surface of the carbon particle, contributing to electron conduction, in contact with a proton conductive passage of a solid polymer electrolyte and a carbon particle contributing to electron conduction, and noting that the carbon particle shows catalytic activity for the reduction reaction of the above compound, and by ion exchange reaction between the compound and polymer electrolyte, a starting compound of catalyst can be preferentially adsorbed on the proton conductive passage of the solid polymer electrolyte.

According to the present invention, in an electrode for a fuel cell containing carbon particles and catalyst material as well as a solid polymer electrolyte, the catalyst material is mainly loaded in proton conductive passages of the solid polymer electrolyte and on the surface of carbon particles in contact with the proton conductive passages.

Preferably, in the electrode for a fuel cell containing carbon particles and catalyst material as well as a solid polymer electrolyte, the catalyst material is mainly loaded on the surface of carbon particles in contact with the proton conductive passages of the solid polymer electrolyte.

The expression of "mainly loaded" means that the amount of the catalyst material, loaded in proton conductive passages of the solid polymer electrolyte and on the surface of carbon particles in contact with the proton conductive passages, exceeds 50 wt % of the entire amount of catalyst, preferably the amount of the catalyst metal loaded on the surface of carbon particles which abut on the proton conductive passages of the solid polymer electrolyte exceeds 50 wt %.

In the electrode for a fuel cell according to the present invention, the catalyst material contains two or more kinds of metal elements, and includes two or more layers containing different metal elements.

A method of manufacturing an electrode for a fuel cell according to the present invention, comprises: a first step of adsorbing a starting compound of catalyst into a solid polymer electrolyte in a mixture containing solid polymer electrolyte and carbon particles, and a second step of chemically reducing starting compound of catalyst in the mixture obtained by the first step, wherein the starting compound of catalyst contains two or more metal elements.

Alternatively, a method of manufacturing an electrode for a fuel cell according to the present invention, comprises repeating twice or more an adsorption/reduction process including: a first step of adsorbing a starting compound of catalyst into a solid polymer electrolyte in a mixture containing solid polymer electrolyte and carbon particles, and a second step of chemically reducing the starting compound of catalyst in the mixture obtained by the first step, wherein the adsorption/reduction process of the starting compound of catalyst (a) is performed once or more, and the adsorption/reduction process of a starting compound of catalyst (b) which containing a metallic element not containing the starting compound of catalyst (a) is performed once or more.

DETAILED DESCRIPTION OF THE INVENTION

Detailed description of the present invention will be described as follows referring to the accompanying drawings.

Now referring to the drawings, an explanation will be given of the structure of an electrode according to the present invention.

Figure 1:
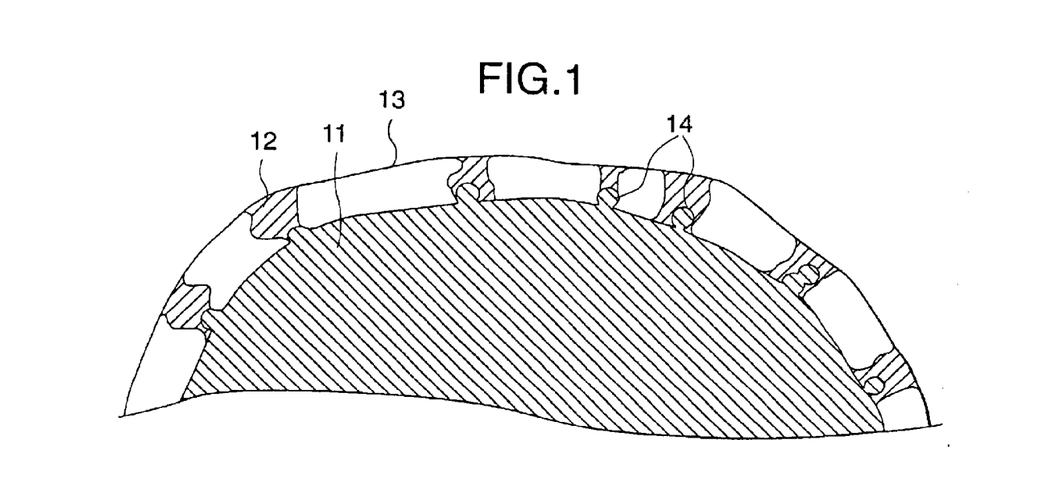
FIG. 1 is a conceptual view showing a state of the surface layer of a carbon particle which abut on a solid polymer electrolyte in an electrode according to the present invention.
Figure 4:
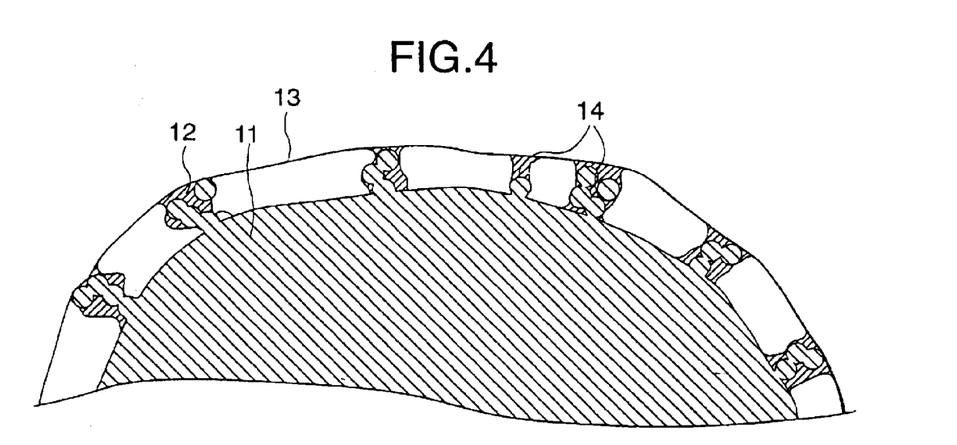
FIG. 4 is a conceptual view showing another state of the surface layer of a carbon particle which abut on a solid polymer electrolyte in an electrode according to the present invention.

FIGS. 1 and 4 are conceptual views each showing the state of the surface of carbon particles covered with a solid polymer electrolyte in the electrode according to the present invention. In FIGS. 1 and 4, reference numeral 11 denotes carbon particle, 12 proton conductive passage, so-called cluster, 13 a hydrophobic backbone and 14 catalyst material.

The electrode according to the present invention is a porous electrode containing a catalyst and a solid polymer electrolyte. The electrode according to the present invention includes electron conductive channels formed by a carbon particle, proton conductive passages formed by the solid polymer electrolyte, and channels for supplying/discharging active materials and a product, formed by a large number of pores. As seen from FIG. 1, in the electrode, the surface of the carbon particle 11 is covered with the solid polymer electrolyte composed of the proton conductive passages 12 and the hydrophobic backbone 13, and the catalyst material 14 are loaded on the surface of the carbon particle 11 in contact with the proton conductive passages 12. The catalyst material 14 include two or more kinds of metal elements, or otherwise include two or more layers containing different metal elements.

FIG. 4 is a conceptual view showing another state of a surface of as carbon particle covered with a solid polymer electrolyte in the electrode according to the present invention. The electrode shown in FIG. 4 is a porous electrode containing a catalyst and a solid polymer electrolyte, and includes electron conductive channels formed by a carbon particle, proton conductive passages formed by the solid polymer electrolyte, and channels for supplying/discharging active materials and a product which are formed by a large number of pores. As seen from FIG. 4, in the electrode, the surface layer of the carbon particle 11 is covered with the solid polymer electrolyte composed of the proton conductive passages 12 and the hydrophobic backbone 13, and the catalyst material 14 are loaded in the proton conductive passages 12 of the solid polymer electrolyte and on the surface of the carbon particle 11 in contact with the proton conductive passages 12. The catalyst material 14 include two or more kinds of metal elements, or otherwise include two or more layers containing different metal elements.

The structure shown in FIG. 1 in which the catalyst material 14 are mainly loaded on the surface of the carbon particle 11 in contact with the proton conductive passage 12 is more preferable in that the area where the catalyst is carried is confined more greatly and hence the metals constituting an alloy will not be separated.

In accordance with the present invention, in the manner as described above, the catalyst material are mainly preferentially supported on the surface of the carbon particle covered with the proton conductive passage, i.e. three-phase boundary so that the a necessary and minimum, very small amount of catalyst material are loaded on limited areas of the very large carbon surface. Thus, the catalyst utilization is improved. Namely, even if a small amount of two or more kinds of metals are carried, they are not dispersed individually, thus not leading to reduction of the alloying degree.

According to the report by T. D. GIERKE (J. Membrane Sci., 13, 307 (1989)), the diameter of the cluster of the proton conductive passage is about 40 Å. Therefore, the average size of the catalyst material loaded on the carbon surface is preferably under 40 Å since it does not impede water or gas.

Further, the catalyst material has a suitable size enough to increase the activity. From the standpoint of view, the size of the average particle diameter of the catalyst material loaded on the contact surface preferably ranges from 20 Å to 40 Å. Incidentally, according to the research by K. Kinoshita et al (J. Electrochem. Soc., 137, 845 (1990)), the particle diameter of platinum exhibiting the high activity for the reduction by oxygen was 30 Å.

The catalyst material used in the present invention is preferably a material capable of improving a CO tolerance characteristic, electrochemical reaction of a liquid fuel such as methanol and reduction characteristic of oxygen. To this end, it preferably contains two or more kinds of metal elements.

For example, in order to improve the CO tolerance characteristic, the catalyst preferably contains two or more platinum group metal elements. Otherwise, the catalyst material preferably contains element selected from a group consisting of Ni, Fe, Co, Mo, Cr, V, Ti, W, Al and Sn, and one of platinum group metal elements.

Further, the catalyst material preferably contains a element selected from a group consisting of Ru, Rh and Ir, and an element of the platinum group metal other than the metallic selected previously. The platinum group metal elements selected previously is preferably platinum.

The catalyst material preferably includes several layers containing different platinum group metal elements. Alternatively, the catalyst material preferably includes a layer containing element selected from a group consisting of Ni, Fe, Co, Mo, Cr, V, Ti, W, Al, Sn, and another layer containing a platinum group metal element.

Otherwise, the catalyst material preferably includes layer containing element selected from a group consisting of Ru, Rh and Ir, and another layer of an element of the platinum group metals other than the metal selected previously. In these combinations, the elements of the platinum group metals is preferably platinum. The external layer of the catalyst material preferably includes a layer containing the platinum group metal elements.

In order to improve the activity for the electrochemical oxidation reaction of the liquid fuel such as methanol, the catalyst material preferably contains two or more platinum group metal elements. Alternatively, the catalyst material preferably contains two or more elements selected from a group consisting of Ru, Sn and Pt, or otherwise preferably contains Ir and at least one element of Ru and Sn. Otherwise, the catalyst material preferably includes several layers each containing different platinum group metal elements. Alternatively, the catalyst material preferably includes several layers each containing different one or more elements selected from a group consisting of Ru, Sn and Pt, or otherwise preferably includes layers containing Ir and at least one element of Ru and Su. The external layer of the catalyst material more preferably includes a layer containing the platinum group metal elements.

In order to improve the activity for reduction characteristic of oxygen, the catalyst material preferably contains platinum and at least one of Fe and Ni. Alternatively, the catalyst material preferably includes layers containing Pt and at least one of Fe and Ni. The external layer of the catalyst material more preferably includes a layer containing platinum.

For example, the catalyst material, when it includes a core of the metal other than a platinum group metal elements and an external layer of the platinum group metal elements, can improve the catalystic activity based on alloying and also greatly reduce the amount of noble metal to be used.

The solid polymer electrolyte is preferably made of ion-exchange resin, particularly, perfluorosulfonic acid or styrene-divinylbenzene sulfonic acid type ion-exchange resin is preferred.

The electrode for a fuel cell according to the present invention can be manufactured by a method including the first step of adsorbing a starting compound of catalyst into a solid polymer electrolyte in a mixture containing its electrolyte and carbon particles and the second step of chemically reducing the starting compound of catalyst in the mixture obtained by the first step, wherein the starting compound of catalyst contains two or more metal elements.

A method of manufacturing an electrode for fuel cell, comprising repeating the base adsorption/reduction process to form catalyst containing two or more metal elements, wherein the process comprises the first step of adsorbing a starting compound of catalyst with a metallic element into a solid polymer electrolyte in the mixture containing the solid electrolyte and carbon particle, followed by the second step of chemically reducing the compound.

Now, in the present invention, the starting compound of catalyst containing two or more metal elements may be a mixture of several metallic compounds, or may be a double salt containing two or more kinds of metal elements.

The electrode for a fuel cell according to the present invention can be also manufactured by a method, in which twice or more an adsorption/reduction process is repeated, including the first step of adsorbing a starting compound of catalyst into a solid polymer electrolyte in a mixture consisting of solid polymer electrolyte and carbon particles and the second step of chemically reducing the starting compound of catalyst in the mixture obtained by the first step, wherein the adsorption/reduction process of a starting compound of catalyst (a), which contains a metal element, is performed once or more, and the adsorption/reduction process of a starting compound of catalyst (b) which contains another metallic element or/and silicon not containing the starting compound of catalyst (a) is performed once or more.

In the manufacturing method according to the present invention, after the first step and the second step have been performed, these steps are repeated once or more so that catalyst material can be grown further using the catalyst material loaded first as a core. Namely, if these steps are repeated twice or more, so that the catalyst having any optional size of catalyst can be controlled easy. Thus, in accordance with the present invention, by adjusting the number of times of repeating the adsorption/reduction process consisting of the first step and the second step, the electrode for a fuel cell can be manufactured which carries highly active catalyst material having a target particle diameter, preferably 20 Å to 40 Å.

The manufacturing method according to the present invention has been accomplished noting the following points. That is, a starting compound of catalyst adsorbed in the solid polymer electrolyte is reduced so that the starting compound of catalyst is reduced to a catalyst material. The carbon particle exhibits catalystic activity for the reduction reaction of the above compound, and by ion exchange reaction between starting compound of catalyst and polymer electrolyte, the starting compound of catalyst can be selectively adsorbed into the proton conductive passage of the solid polymer electrolyte. Such a method can be applied to manufacture not only the electrode according to the present invention but also an electrode for a fuel cell having another structure.

The starting compound of catalyst used in the manufacturing method according to the present invention is a compound containing a metallic element capable of being a catalyst material by its reduction. The starting compound of catalyst may be a single compound containing double salt and a mixture of plural compounds containing different element each other. The catalyst material may have any format inclusive of the shape as long as it serves as a catalyst. For example, the catalyst material which produces catalytic metallic particles by reduction may be employed. The catalyst material thus obtained is preferably a material capable of improving a CO tolerance characteristic, the activity for electrochemical reaction of a liquid fuel such as methanol and reduction characteristic of oxygen. To this end, the starting compound of catalyst must contain two or more kinds of metal elements.

For example, in order to manufacture the electrode capable of improving the CO tolerance characteristic, the starting compound of catalyst preferably contains two or more platinum group metal elements. Otherwise, the starting compound of catalyst preferably contains an element selected from a group consisting of Ni, Fe, Co, Mo, Cr, V, Ti, W, Al and Sn, and an element of platinum group metal elements. Further, the starting compound of catalyst preferably contains one selected from a group consisting of Ru, Rh and Ir, and an element of the platinum group other than the element selected previously. The platinum group of the platinum group metal selected previously is preferably platinum.

In order to improve the activity for the electrochemical oxidation reaction of methanol, the starting compound of catalyst preferably contains two or more platinum group metal elements. Otherwise, the starting compound of catalyst preferably contain two or more elements selected from a group consisting of Ru, Sn and Pt, or otherwise preferably contains at least one element of Ru and Su, and Ir element.

In order to improve the activity for the reduction characteristic of oxygen, the starting compound of catalyst preferably contains at least element of Fe and Ni, and Pt element.

In this way, if the starting compound of catalyst contains two or more kinds of metal elements or/and silicon, when it is reduced, they are expected to be a mixed catalyst in an atomic level, thus greatly improving the catalystic activity due to alloying.

The starting compound of catalyst (a) and/or (b) described above are compounds containing a platinum group metal elements. Otherwise, one of the starting compound of catalyst (a) and (b) contains a compound of an element selected from a group consisting of Ni, Fe, Co, Mo, Cr, V, Ti, W, Al and Sn, whereas the other thereof contains a compound of a platinum group metal elements. Further, one of the starting compound of catalysts (a) and (b) preferably contains a compound of an element selected from a group consisting of Ru, Rh and Ir, whereas the other thereof contains an element of the platinum group other than the element selected previously. In these combinations, the element of the platinum group metal selected previously is preferably platinum.

In order to improve the electrochemical oxidation reaction of methanol, the starting compound of catalyst (a) and/or (b) is preferably a compound containing a platinum group metal elements. Otherwise, they are preferably different elements selected from a group consisting of Ru, Sn and Pt each other, or otherwise one of them preferably contains at least one element of Ru and Su, whereas the other thereof contains an Ir element.

In order to improve the reduction characteristic of oxygen, one of the starting compound of catalysts (a) and (b) preferably contains at least one of Fe and Ni, whereas the other thereof contains an platinum element.

In this way, where the starting compound of catalyst (a) and starting compound of catalyst (b) are adsorbed and reduced in their individual steps, it is expected that the catalyst material consisting of several layers. For example, after a metal other than platinum group metal is first loaded, it is coated with a layer of a platinum group metal. This improves the catalystic activity due to alloying and permits the amount of using the noble metal to be greatly reduced.

Where a compound of the platinum group metal such as Pt, Rh, Ru, Ir, Pd, Os, etc. is used as the starting compound of catalyst, it is preferably its metallic salt or complex, particularly, an amine complex of the platinum group metal elements expressed by $[M(NH_3)_4]X_2$, $[M(NH_3)_6]X_2$, $[M(NH_3)_6]X_4$, or $[M(NH_3)_6]X_3$ (M denotes a platinum group metal, X denotes a monovalent anion).

The carbon particle may preferably be carbon having the high activity for the reduction reaction of the starting compound of catalyst. For example, in case of using the starting compound of catalyst containing the platinum group metal elements, carbon black, particularly, acetylene black such as Denka Black, Valcan XC-72, BlackjPearl12000, etc., is preferred.

The mixture composed of carbon particles and solid polymer electrolyte may preferably be in solid form. For example, it is prepared in the form of a porous material composed of a compound as starting material of catalyst dispersed in a parent body including a solid polymer electrolyte in the form of membrane or the like. The use of such a porous material is desirable.

The mixture composed of carbon particles and solid polymer electrolyte is preferably prepared by one of the following processes.

(1) The mixture is produced by a process Ni which a paste composed of carbon particle, a solid polymer electrolyte solution, and optionally a solution having a PTFE particle dispersed therein are applied to a polymer film to make a sheet made form the paste (preferably having a thickness of from 3 to 30 μm) which is dried.

(2) The mixture is produced by a process in which a paste composed of carbon particle and a solution having a PTFE particle dispersed therein is applied to a polymer film to make a sheet made from the paste (preferably having a thickness of from 3 to 30 μm) which is then dried, and then a solid polymer electrolyte solution is applied to the sheet so that the sheet made from the paste is impregnated with the solid polymer electrolyte solution.

(3) The mixture is produced by a process in which a paste composed of carbon particle, a solid polymer electrolyte solution an optionally a solution having a PTFE particle dispersed therein is applied to a carbon electrode substrate which is electro-conductive porous material, and then the coated material is dried.

(4) The mixture is produced by a process in which a paste composed of carbon particle and a solution having a PTFE particle disposed therein is applied to a carbon electrode substrate which is electro-conductive porous material, the coated material is heated and dried, and a solid polymer electrolyte solution is applied to the coated material so that the coated material is impregnated with the solid polymer electrolyte solution.

Alternatively, the mixture composed of carbon particle and solid polymer electrolyte solution may be connected to both or either surface of the ion-exchange membrane.

The adsorption of the starting compound of catalyst is preferably carried out by ion-exchange reaction between starting compound of catalyst and the solid polymer electrolyte so that it is selectively adsorbed on the proton conductive passage of the solid polymer electrolyte.

For example, in the mixture of a solid polymer electrolyte and carbon particles, the above adsorption is performed by the ion-exchange reaction between the counter ions of an ion-exchange functional group in the solid polymer electrolyte and the cation containing the catalyst metallic element. Specifically, for example, it is carried out by dissolving a catalyst metal compound for creating cations containing the catalyst metallic element in a water or alcohol solution, and immersing the mixture containing the solid polymer electrolyte and carbon particles. Now, where the catalyst metallic compound for creating the cations containing the catalyst metallic element is used in the water or alcohol solution, in the present invention, it is impossible to employ a mixed solution of several catalyst metallic compounds. For example, a water mixed solution of a platinum compound and a Ru compound. In this case, in the step of adsorption, through the ion-exchange reaction with the counter ion in the solid polymer electrolyte, the cations containing Pt and Ru element are simultaneously adsorbed in the proton conductive passage in the solid polymer electrolyte. Therefore, in the subsequent reduction step, it is expected that a Pt—Ru alloy will be formed.

The starting compound of catalyst for creating the cations of the catalyst metallic element in the water or alcohol solution used in the adsorption step is preferably such that the created cations containing the catalyst metallic element will not be adsorbed on the carbon surface uncovered with the solid polymer electrolyte, but adsorbed preferentially in the proton conductive passage of the solid polymer electrolyte by the ion-exchange reaction between the counter ion in the solid polymer electrolyte and the cation. For example, it is preferably a complex of a platinum group metal, particularly, an amine complex of the platinum group metal elements expressed by $[Pt(NH_3)_4]X_2$, O $[Pt(NH_3)_6]X_4$, $[Ru(NH_3)_6]X_2$ or $[Ru(NH_3)_4]X_3$ (X denotes a monovalent anion). X is preferably chlorine. Among them, it is preferably a divalent amine complex of Pt and Ru, particularly a tetraammine Pt(II) chloride $([Pt(NH_3))_4]Cl_2 \cdot nH_2O)$, and $([Ru(NH_3)_6]Cl_2, ([Ru(NH_3)_6]Cl_3$.

The starting compound of catalyst in the prepared mixture of the starting compound of catalyst, carbon particles and solid polymer electrolyte can reduced by a chemical reducing technique using a reducing agent suitable for mass production. Particularly, techniques of vapor-phase reduction using hydrogen or hydrogen-containing gas, or inert gas containing hydrazine.

In the reduction, since the carbon particle has the catalystic activity for the reduction reaction, the starting compound of catalyst on the surface of the carbon particle is predominantly reduced as compared with that in the solid polymer electrolyte apart from the carbon surface. Therefore, by adjusting the kind of a reducing agent to be used, reduction pressure, concentration of the reducing agent, reduction time and reduction temperature, the starting compound of catalyst on the surface of the carbon particle can be more predominantly reduced so that the catalyst material is reduced and loaded mainly on surface of the carbon particle in contact with proton conductive passage of the solid polymer electrolyte.

The temperature of the reduction by hydrogen is preferably lower than decomposition temperature of the solid polymer electrolyte, and is more preferably lower than its glass transfer temperature to prevent the degradation of the solid polymer electrolyte. Therefore, the carbon particle and starting compound of catalyst are preferably combined so that the reduction temperature of the starting compound of catalyst by hydrogen is lower than the dissolving temperature of the solid polymer electrolyte and glass transfer temperature.

The solid polymer electrolyte which is generally used for the electrode of a fuel cell is a perfulorosulfonic acid type having a decompose temperature of 280° C. If the starting compound of catalyst is reduced at a lower temperature than 280° C., or more preferably than 120° C. that is the glass transfer temperature of perfulorosulfonic acid, the degradation of the solid polymer electrolyte can be suppressed.

The starting compound of catalyst which has been left without being reduced can be extracted from the electrode by immersing the electrode in an acidic solution such as hydrochloric acid or sulfonic acid after the reduction step using has been completed.

EXAMPLES

An explanation will be given of examples of the present invention.

First, a Pt—Pd loaded in electrode in which an alloy of Pt—Pd is carried will be explained.

Example 1

A solid polymer electrolyte (Nafion 5 wt % solution available from Ardrich Corp.) is mixed with carbon particles (Valcan XC-72, Cabot) and PTFE particles (Teflon 30J) to form a paste. The paste is applied onto a hydrophobic carbon substrate of electro-conductive porous material having water repellency (0.5 mm), which is dried in an atmosphere of nitrogen for one hour at 120° C.

Subsequently, a dispersed matter of the solid polymer electrolyte and carbon particles is immersed in a mixed solution of $[Pt(NH_3)_4]Cl_2$ and $[Pd(NH_3)_4]Cl_2$ (mol ratio 1:1) for two days so that $[Pt(NH_3)_4]^{2-}$ and $[Pd(NH_3)_4]^{2+}$ are adsorbed in the proton conductive passage of the solid polymer electrolyte by the ion exchange. Thereafter, the product is sufficiently rinsed in deionized water and dried, and reduced in hydrogen gas for about six hours at 240° C. under 30 atom. Thus, the alloy of Pt and Pd is mainly loaded on the surface of the carbon particle in contact with proton conductive passage of the solid polymer electrolyte.

The product is immersed for one hour in a hydrochloric acid of 1 mol/l to extract unnecessary $[Pt(NH_3)_4]Cl_2$ and $[Pd(NH_3)_4]Cl_2$ to acquire electrode A in this embodiment. According to the analysis performed separately, it was confirmed that the amount of platinum loaded in the electrode A is 0.05 mg/cm2.

Example 2

As in Example 1, the solid polymer electrolyte is mixed with the carbon particles and PTFE particles to form a paste. The paste is applied onto a hydrophobic carbon substrate of electro-conductive porous material (0.5 mm), which is dried in an atmosphere of nitrogen for one hour at 120° C.

Subsequently, a dispersion of the solid polymer electrolyte and carbon particles is immersed in a $[Pd(NH_3)_4]Cl_2$ solution for two days so that $[Pd(NH_3)_4]^{2+}$ is adsorbed into the proton conductive passage of the solid polymer electrolyte by the ion exchange reaction. Thereafter, the product is sufficiently rinsed in deionized water and dried, and reduced in hydrogen gas for about six hours at 240° C. under 30 atm. so that Pd is loaded in it. The product is further immersed in a $[Pt(NH_3)_4]Cl_2$ solution for two days so that $[Pt(NH_3)_4]^{2+}$ is adsorbed on the proton conductive passage of the solid polymer electrolyte by the ion exchange reaction. Thereafter, the product is sufficiently rinsed in deionized water and dried, and reduced in hydrogen gas for about six hours at 240° C. under 30 atom so that an alloy of Pt and Pd is mainly loaded on the surface of the carbon particle in contact with proton conductive passage of the solid polymer electrolyte.

The product is immersed for one hour in a hydrochloric acid of 1 mol/l to extract unnecessary $[Pt(NH_3)_4]Cl_2$ and $[Pd(NH_3)_4]Cl_2$ to acquire electrode B in this embodiment. According to the analysis performed separately, it was confirmed that the amount of platinum loaded in the electrode B is 0.05 mg/cm2.

Comparative Example 1

The carbon particles (Vulcan XC 72) are impregnated with a mixed solution of $H_2PtCl_6$ and $PdCl_2$ (mol ratio 1:1). The carbon, after having been rinsed and dried, is reduced by hydrogen gas (500° C.). Thus, a Pt—Pd supported on carbon with an alloy of Pt and Pg is acquired. It was found that the amount of platinum carried by the carbon particle is 15 wt %.

This Pt—Pg supported on carbon is mixed with the solid polymer electrolyte and PTFE particles which were used in the first embodiment to form a paste. The paste is applied onto a hydrophobic carbon substrate of electro-conductive porous material (0.5 mm), which is dried in an atmosphere of nitrogen for one hour at 120° C. to provide electrode C in this comparative example. The amount of the Pt—Pd supported on carbon when the paste is formed was adjusted so that the amount of platinum loaded on the electrode C is about 0.05 mg/cm2.

Comparative Example 2

The carbon particles (Vulcan XC 72) are impregnated with a $PdCl_2$ solution. The product, after having been rinsed and dried, is reduced by hydrogen gas (500° C.) so that Pd loaded on the carbon particle. The carbon particle supporting Pd is impregnated with a $H_2PtCl_6$ solution. The product, after having been rinsed and dried, is reduced by hydrogen gas (500° C.). Thus, carbon supporting an alloy of Pt and Pd is acquired. It was found that the amount of platinum carried by the carbon particle is 15 wt %.

This Pt—Pd supported on carbon is mixed with the solid polymer electrolyte and PTFE particles which were used in the first embodiment to form a paste. The paste is applied onto a carbon hydrophobic substrate of electro-conductive porous material (0.5 mm), which is dried in an atmosphere of nitrogen for one hour at 120° C. to provide electrode D in this comparative example. The amount of the Pt—Pd supported on carbon when the paste is formed was adjusted so that the amount of platinum loaded in the electrode D is about 0.05 mg/cm2.

The electrodes A and B according to the present invention and electrodes C and D according to the comparative example were bonded to both surfaces of an ion exchange membrane each other (Nafion, thickness of 50 μm). They are assembled into fuel cell units to provide cells A, B, C and D.

Figure 5:
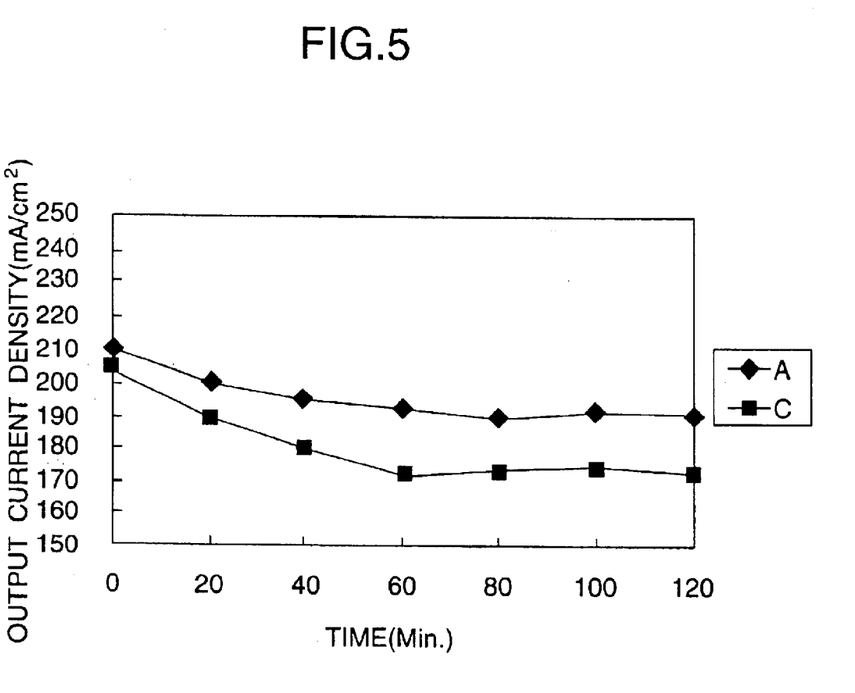
FIG. 5 is a graph showing changes in the output currents of cells A and C.

The changes in the currents of the cells A, B, C and D were measured with a fixed output voltage of 0.6 V using a cathode supply gas of $O_2$ (2 atm., 80° C.) and anode supply gas of a mixed gas of $H_2$ and CO (CO: 100 ppm, 2 atm., 80° C.). The changes in the output currents of the cells A and C are shown in FIG. 5. The change in the current of the cell B was substantially the same as that in the cell A, and the change in the current of the cell D was substantially the same as the cell C.

It can be seen from FIG. 5 that the cells A and B using the electrodes A and B show higher CO-tolerance than the cells C and D using the conventional electrodes C and D.

This is probably because the electrode according to the present invention has improved the catalyst utilization since the Pt—Pd catalyst is mainly loaded at the three-phase boundary existing on the surface of the carbon particle in contact with proton conductive passage of the solid polymer electrolyte, and also because Pt and Pd are not dispersed individually to maintain the alloying rate provide a high alloying rate of Pt and Pd and hence a high CO tolerance characteristic.

The cell having the electrode supported on the alloy of Pt and Ru will be explained below.

Example 3

A solid polymer electrolyte (Nafion 5 wt % solution available from Ardrich Corp) is mixed with carbon particles (Vulcan XC-72) to form a paste. The paste is applied onto a hydrophobic carbon substrate of conductive porous material (0.5 mm), which is dried in an atmosphere of nitrogen for one hour at 80° C.

Subsequently, a mixture of the solid polymer electrolyte and carbon particles is immersed in a solution of $[Pt(NH_3)_4]Cl_2$ of 50 mm mol/l for 24 hours so that $[Pt(NH_3)_4]^{2+}$ is adsorbed into the proton conductive passage of the solid polymer electrolyte through the ion exchange reaction (step-a). Thereafter, the product is sufficiently rinsed in purified water and dried, and reduced in hydrogen gas for about six hours at 200° C. under 2 atom (step-b) to load Ru. The step-a and step-b were repeated once more.

Subsequently, the product is immersed in a solution of $[Ru(NH_3)_6]Cl_3$ for two days so that $[Ru(NH_3)_6]^{3+}$ is adsorbed on the proton conductive passage of the solid polymer electrolyte by the ion exchange reaction (step-c). Thereafter, the product is sufficiently rinsed in purified water and dried, and reduced in hydrogen gas for about six hours at 200° C. under 2 atom (step-d). The step-c and step-d were repeated twice more.

The product is immersed for one hour in a sulfuric acid of 0.5 mol/l to extract unnecessary $[Ru(NH_3)_6]Cl_3$ and $[Pt(NH_3)_4]Cl_2$ to acquire electrode E in this embodiment. According to the analysis performed separately, it was confirmed that the amount of platinum carried by the electrode E is 0.04 mg/cm2.

Comparative Example 3

The carbon particles (Vulcan XC 72) are impregnated with a mixed solution of $H_2PtCl_6$ and $RuCl_2$ (mol ratio 1:1). The product, after having been rinsed and dried, is reduced by hydrogen gas (500° C.). Thus, carbon supporting with an alloy of Pt and Ru is acquired. It was found that the amount of platinum carried by the carbon particle is 15 wt %.

This Pt—Ru supported on carbon is mixed with the solid polymer electrolyte and PTFE particles which were used in the third embodiment to form a paste. The paste is applied onto a hydrophobic carbon substrate of conductive porous material (0.5 mm), which is dried in an atmosphere of nitrogen for one hour at 120° C. to provide electrode F in this comparative example. The amount of the Pt—Ru supported on carbon when the paste is formed was adjusted so that the amount of platinum carried by the electrode F is about 0.12 mg/cm2.

The electrodes E and F were bonded to both surfaces of an ion exchange membrane (Nafion having a thickness of 50 μm available from DUPON CO.) by hot press (140° C.) each other to provide two kinds of electrode membrane assemblies. They are assembled into fuel cell units to provide cells E and F.

The changes in the currents of the cells E and F were measured with a fixed output voltage of 0.6 V using a cathode supply gas of $O_2$ (2 atom, 80° C.) and anode supply gas of a mixed gas of $H_2$ and CO (CO: 100 ppm, 2 atom, 90° C.). The changes in the output currents of the cells E and F are shown in FIG. 6.

Figure 6:
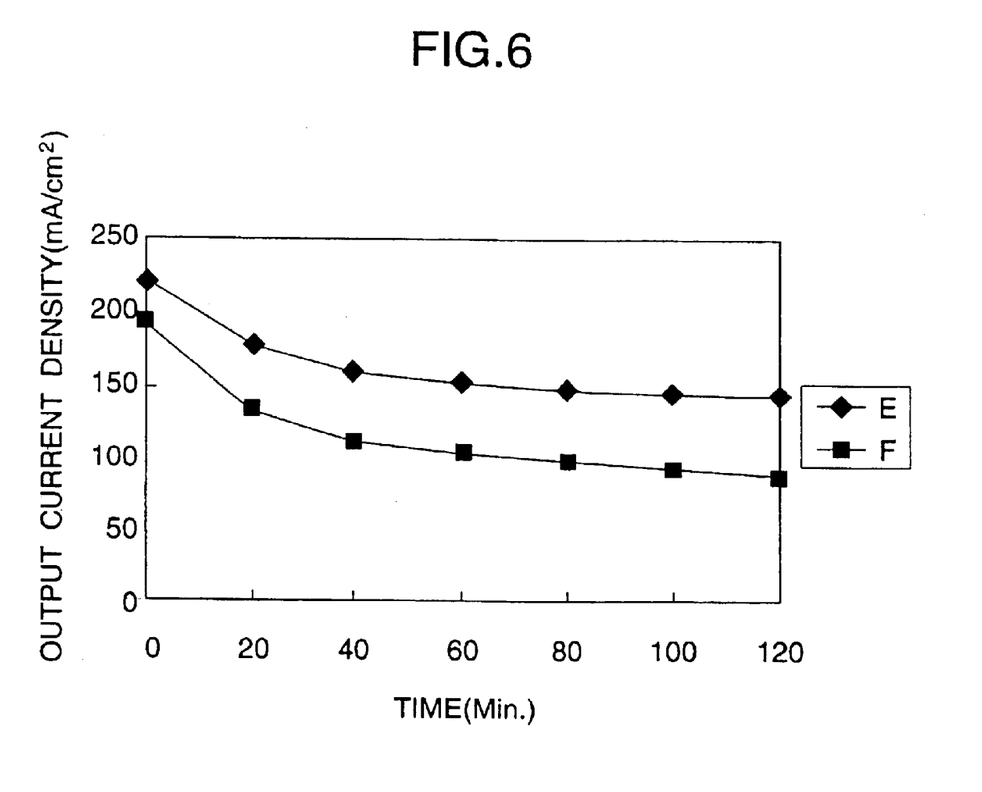
FIG. 6 is a graph showing changes in the output currents of cells E and F.

It can be seen from FIG. 6 that the cell E exhibits a high output characteristic although its amount of platinum which is only ⅓ as large as the conventional cell F. This is probably because the electrode according to the present invention improve the catalyst utilization and alloying rate, and resulting in improvement of the CO tolerance characteristic.

Example 4

As in Example 1, the solid polymer electrolyte is mixed with the carbon particles and PTFE particles to form a paste. The paste is applied onto a hydrophobic carbon substrate of electro-conductive porous material (0.5 mm), which is dried in an atmosphere of nitrogen for one hour at 120° C.

Subsequently, a dispersion of the solid polymer electrolyte and carbon particles is immersed in a $Ni(NO_3)_2$ solution for two days so that $Ni^{2+}$ is adsorbed into the proton conductive passage of the solid polymer electrolyte by the ion exchange reaction. Thereafter, the product is sufficiently rinsed in deionized water and dried, and reduced in hydrogen gas for about six hours at 240° C. under 30 atm. so that Ni is loaded in it. The product is further immersed in a $[Pt(NH_3)_4]Cl_2$ solution for two days so that $[Pt(NH_3)_4]^{2+}$ is adsorbed on the proton conductive passage of the solid polymer electrolyte by the ion exchange reaction. Thereafter, the product is sufficiently rinsed in deionized water and dried, and reduced in hydrogen gas for about six hours at 240° C. under 30 atom so that an alloy of Pt and Pd is mainly loaded on the surface of the carbon particle in contact with proton conductive passage of the solid polymer electrolyte.

The product is immersed for ten minutes in a hydrochloric acid of 0.1 mol/l to extract unnecessary $[Pt(NH_3)_4]Cl_2$ and $Ni(NO_3)_2$ to acquire electrode G in this embodiment. According to the analysis performed separately, it was confirmed that the amount of platinum loaded in the electrode G is 0.05 mg/cm2.

Comparative Example 4

The carbon particles (Vulcan XC 72) are impregnated with a $NiCl_2$ solution. The product, after having been rinsed and dried, is reduced by hydrogen gas (500° C.) so that Ni loaded on the carbon particle. The carbon particle supporting Ni is impregnated with a $H_2PtCl_6$ solution. The product, after having been rinsed and dried, is reduced by hydrogen gas (500° C.). Thus, carbon supporting an alloy of Pt and Ni is acquired. It was found that the amount of platinum carried by the carbon particle is 15 wt %.

This Pt—Ni supported on carbon is mixed with the solid polymer electrolyte and PTFE particles which were used in the first embodiment to form a paste. The paste is applied onto a carbon hydrophobic substrate of electro-conductive porous material (0.5 mm) which is dried in an atmosphere of nitrogen for one hour at 120° C. to provide electrode H in this comparative example. The amount of the Pt—Ni supported on carbon when the paste is formed was adjusted so that the amount of platinum loaded in the electrode H is about 0.05 mg/cm2.

The electrode G according to the present invention and electrode H according to the comparative example were bonded to both surfaces of an ion exchange membrane each other (Nafion, thickness of 50 μm). They are assembled into fuel cell units to provide cells G and H.

The changes in the currents of the cells G and H were measured with a fixed output voltage of 0.6 V using a cathode supply gas of $O_2$ (2 atm., 80° C.) and anode supply gas of a mixed gas of $H_2$ (CO: 100 ppm, 2 atm., 80° C.). The changes in the output currents of the cells H and G are shown in FIG. 7.

Figure 7:
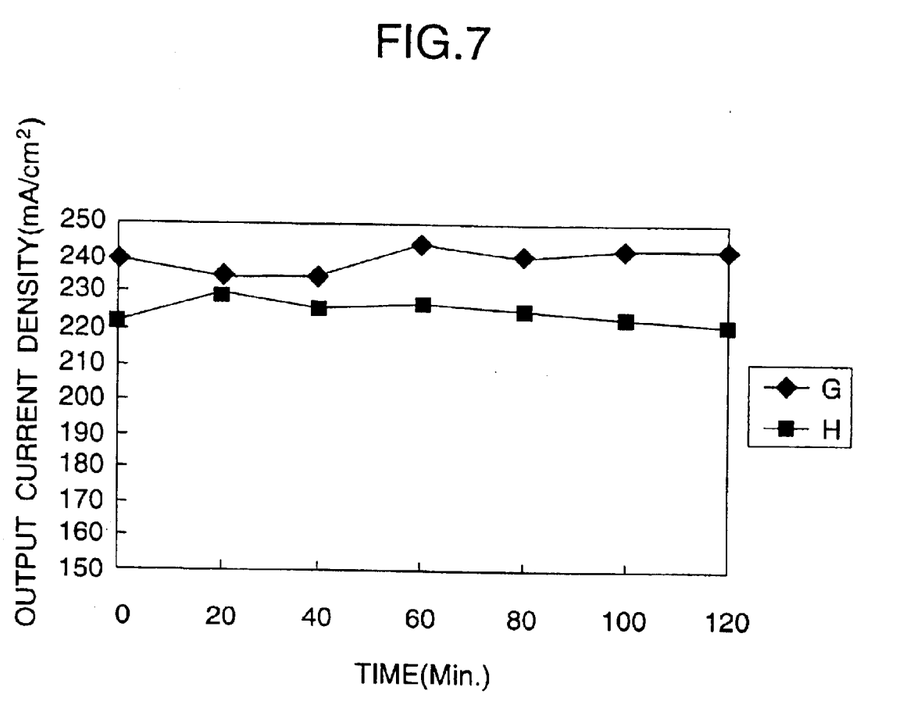
FIG. 7 is a graph showing changes in the output currents of cells G and H.

It can be seen from FIG. 7 that the cell G using the electrode G shows higher cell performance than the cell H using the conventional electrode H.

This is probably because the electrode according to the present invention has improved the activity for $O_2$ reduction reaction of the catalyst since the Pt—Ni catalyst is mainly loaded at the three-phase boundary existing on the surface of the carbon particle in contact with proton conductive passage of the solid polymer electrolyte, and also because Pt and Ni are not dispersed individually to maintain the alloying rate provide a high alloying rate of Pt and Ni.

The present invention provides an electrode for a fuel cell having a high catalyst utilization, high CO tolerance characteristic, oxidizing characteristic for a liquid fuel such as methanol. Namely, the present invention provides an inexpensive and high-performance fuel electrode.

In the method of manufacturing an electrode for a fuel cell according to the present invention, the catalyst material containing two or more kinds of metals is mainly loaded on the three-phase boundary existing on the surface of a carbon particle in contact with the proton conductive passage of the solid polymer electrolyte. Therefore, all the catalyst material can be made effective on the three-phase boundary. This improves the catalyst utilization and permits the high performance electrode supported on the catalyst with a high alloying rate to be manufactured.

What is claimed is:

1. An electrode for a fuel cell comprising carbon particles, catalyst material and solid polymer electrolyte containing both proton conductive passages and backbone, wherein the catalyst material contains two or more metal elements and is mainly loaded on the sites where the surfaces of said carbon particles contact with the proton conductive passages, and the amount of catalyst material loaded on said sites exceeds 50 wt % of the entire loaded amount of catalyst material in the electrode.

2. The electrode for a fuel cell according to claim 1, wherein the catalyst material contains Pt and Ru.

3. The electrode for fuel cell according to claim 1, wherein the catalyst material contains an element of platinum group metals and an element selected from the group consisting of Ni, Fe, Co, Mo, Cr, V, Ti, W and Al.

4. The electrode for a fuel cell according to claim 1, wherein the catalyst material includes two or more layers each containing different metal elements.

5. An electrode for a fuel cell comprising carbon particles, catalyst material and solid polymer electrolyte containing both proton conductive passages and backbone, wherein the catalyst material contains two or more metal elements and is mainly loaded in the proton conductive passages and on the sites where the surfaces of carbon particles contact with the proton conductive passages, and the total amount of catalyst material loaded both in the proton conductive passages and on said sites exceeds 50 wt % of the entire loaded amount of catalyst material in the electrode.

\* \* \* \* \*